United States Patent [19]

Shibanai et al.

[11] Patent Number: 4,808,396
[45] Date of Patent: Feb. 28, 1989

[54] OZONE DECOMPOSING AGENT

[75] Inventors: Ichiroh Shibanai, Tokyo; Sakae Shimizu, Chigasaki, both of Japan

[73] Assignees: Ricoh Company, Ltd.; Japan Liquid Crystal Co., Ltd., both of Tokyo, Japan

[21] Appl. No.: 86,784

[22] Filed: Aug. 19, 1987

[30] Foreign Application Priority Data

Aug. 28, 1986 [JP] Japan ................. 61-202268

[51] Int. Cl.⁴ .............. B01D 53/34; C01B 13/00; C09K 15/00
[52] U.S. Cl. .................. 423/579; 423/210; 423/219; 423/581; 252/188.1; 252/188.2; 252/188.28
[58] Field of Search ........... 252/188.1, 188.2, 188.28; 423/581, 210, 219, 579

[56] References Cited

U.S. PATENT DOCUMENTS

| 4,459,269 | 7/1984 | Zackay et al. | 423/219 |
| 4,617,147 | 10/1986 | Shibanai | 512/4 |
| 4,619,821 | 10/1986 | Ely | 423/219 X |

FOREIGN PATENT DOCUMENTS 61-64315 4/1986 Japan.

Primary Examiner—John F. Terapane
Assistant Examiner—Virginia B. Caress
Attorney, Agent, or Firm—Oblon, Fisher, Spivak, McClelland & Maier

[57] ABSTRACT

An ozone decomposing agent comprises at least one terpenoide capable of decomposing ozone, a liquid alcohol for dissolving therein the terpenoide, dibenzylidenesorbitol or sodium bis (4-t-butylphenyl)phosphate, and a solvent for dissolving therein dibenzylidenesorbitol or sodium bis (4-t-butyl-phenyl)phosphate, or the ozone decomposing agent may comprise such terpenoide and a water-soluble gelation agent for holding the terpenoide.

21 Claims, 1 Drawing Sheet

OZONE DECOMPOSING AGENT

OZONE DECOMPOSING AGENT

OZONE DECOMPOSING AGENT

BACKGROUND OF THE INVENTION

The present invention relates to an ozone decomposing agent for decomposing ozone which is formed, for instance, in a corona charger for electrophotographic copying machines and laser printers, and in the apparatus for purifying water and air in which ozone is employed for such purification.

Ozone is formed by the action of sunlight, ultraviolet light or sparks of thunder on oxygen of the air. It is also formed when electrical apparatus for industrial use produces sparks in the air. For instance, a corona charger employed in copying machine ionizes the ambient air when it is in operation, and such ionization promotes the formation of ozone. Ozone is toxic to human beings and lower animals when breathing air containing more than 0.1 ppm of ozone for long periods of time. According to the safety standards for ozone to human beings proposed by Japan Association of Industrial Health, ACGIH (American Conference of Governmental Industrial Hygienists), and OSHA (Occupational Safety and Health Administration), the permissible maximum average concentration of ozone in the air is 0.1 ppm when breathing the air for 8 hours. Many apparatus for industrial use are produced by observing these standards. Ozone has a characteristic, pungent odor, and the odor is noticeable even at concentrations as low as 0.01 to 0.02 ppm. Some operators of an industrial apparatus which forms ozone at such concentrations may complain about the odor. When the concentration amounts to about 0.05 ppm, it has an unpleasant odor, and when the concentration exceeds 0.1 ppm, it is irritating to mucous membranes of the eyes and respiratory organs.

Further, ozone is a powerful oxidizing agent which oxidizes and deteriorates organic materials. Therefore, it is desirable that the concentration of ozone be as low as possible, not only to human beings, but also to industrial apparatus and devices.

Ozone is employed at concentrations as high as 500–2500 ppm for sterilization of water and for treatment of raw sewage by deodorization and decolorization thereof. For example, when water is sterilized by ozone, 1 to 3 g of ozone is blown into 1 $m^3$ of water. Most of the ozone blown into water is decomposed in the water, but some of the remaining ozone is discharged from the water into the air. However, since the concentration of the thus discharged ozone in the air is usually as high as 1 ppm, it is necessary to decompose the discharged ozone before it spreads into the air for the safety to human beings and for the protection of environment.

Since ozone is toxic to human beings when its concentration in the air is high, various methods have been proposed to decrease the concentration of ozone.

For example, filters made of an organic hydrocarbon such as activated carbon are employed for sewage purification.

Filters comprising Hopcalite catalyst, such as metal oxides of manganese, copper, silver and cobalt, are also employed for decomposition of ozone. In addition to this, a method of using a paint containing a variety of organic materials has been proposed, although the decomposition efficiency is not high enough for use in practice.

In Japanese Laid-Open Patent Application No. 49-87334, there is proposed a method of decomposing ozone by using a rubber olefin polymer containing double-bond groups with which ozone may react, which method is for use in an electrophotographic copying machine.

In Japanese Laid-Open Patent Application No. 61-64315 there is proposed a method of removing ozone by using terpenoide.

When any of filters containing activated carbon or Hopcalite catalyst is employed, if the density of the filter is high, the absorption of ozone thereto and the ozone decomposition efficiency can be increased. However, the flow rate of the air through the filter decreases and accordingly the pressure loss of the air increases. The result is that the temperature within the apparatus in which such filter is employed may increase and the life of the apparatus may be accordingly shortened. On the contrary, if the density of the filter is decreased, the absorption of ozone and the ozone decomposition efficiency are decreased. In any event, a suction device is necessary for causing the air containing ozone to pass through such filters, and in some cases, a cooling apparatus may become necessary for not raising the temperature within the apparatus. The result is that the entire price of the apparatus becomes high.

When purifying water, a large quantity of activated carbon has to be used so that this method is expensive. Furthermore, the ozone decomposition power of activated carbon significantly decreases when activated carbon comes into contact with an organic solvent such as acetone.

When a rubber olefin polymer is employed for decomposition of ozone, since the reaction of decomposition of ozone is of a solid-to-gas reaction type, the decomposition efficiency is not only low, but also it loses its decomposition power in a short time.

In addition to the above ozone decomposing agents, the following ozone decomposing agents are known: terpenoides capable of decomposing ozone, such as linalool, linalool ester and citral, dissolved in alcohol; natural essential oils containing, for instance, linalool; terpenoids; terpenoids absorbed in an absorbent such as porous silica powder. From these ozone decomposing agents, a terpenoide vaporizes and spreads into the air to react with ozone in the air, thereby decomposing ozone. In these ozone decomposing agents, however, the vaporization rate is not constant and it is difficult to continue the vaporization with a constant rate over a long period of time. More specifically, it has a tendency that it vaporizes very quickly in the beginning, and immediately the varporization drastically decreases. In order to continue the vaporization over a long period of time, a large amount of the ozone decomposing agents is required and therefore these ozone decomposing agents are expensive.

SUMMARY OF THE INVENTION

Accordingly, it is an object of the present invention to provide an improved ozone decomposing agent from which the above-mentioned conventional shortcomings have been eliminated, having high ozone decomposing effect, which lasts for a long period of time with a constant vaporization rate.

According to the present invention, this object is attained by an ozone decomposing agent comprising at least one terpenoide capable of decomposing ozone, a liquid alcohol, dibenzylidenesorbitol or sodium bis(4-t-butylphenyl)phosphate, and a solvent for dissolving therein dibenzylidenesorbitol or sodium bis(4-t-butyl-phenyl)-phosphate.

The above object of the present invention can also be attained by an ozone decomposing agent comprising at least one terpenoide capable of decomposing ozone and a water-soluble gelation agent for holding the terpenoide therein.

DETAILED DESCRIPTION OF THE PREFERRED EMBODIMENTS

Figure 1:
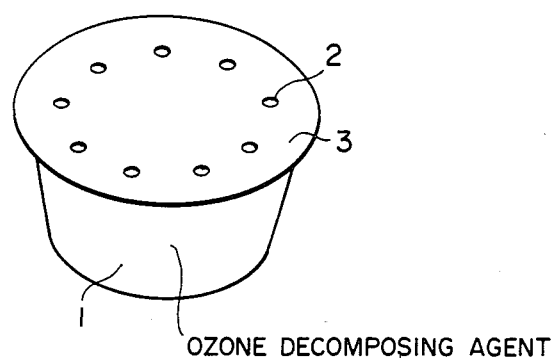
FIG. 1 is a schematic perspective view of a container in which an ozone decomposing agent according to the present invention is placed.

The terpenoides for use in the present invention are such terpenoides that are capable of decomposing ozone.

Preferable examples of such terpenoides are those having a general formula of $C_mH_{2n+14}O_p$ wherein $m=9 \sim 15$, $n=0 \sim 4$ and $p=0 \sim 2$, including hydrocarbons such as monoterpenes, sesquiterpenes, alcohol-, aldehyde- and ketone-derivatives of terpenes.

Specific examples of such terpenoides are as follows:

$C_9H_{14}$: santene;
$C_9H_{14}O$: cryptone;
$C_9H_{16}$: cyclogeraniolene;
$C_{10}H_{14}O$: safranal, perillaldehyde, carvone, piperitenone, myrtenal, umbellulone, verbenone and pinocarvone;
$C_{10}H_{16}$: B-myrcene, ocimene, limonene, dipentene, isolimonene, terpinene, phellandrene, 2,8(9)-p-menthadiene, sylvestrene, carene pinene, camphene, bornylene, fenchene and orthodene;
$C_{10}H_{16}O$: citral, tagetone, artemisiaketone, isoartemisiaketone, cyclocitral, perillyl alcohol, carveol, phellandral, piperitone, pulegone, isopulegone, carvenone, dihydrocarvone, carvotanacetone, pinol, sabinol, pinocarveol, myrtenol, verbenol and cis-3-hexenol;
$C_{10}H_{16}O_2$: diosphenol and ascaridole;
$C_{10}H_{18}O$: Linalool, geraniol, cyclogeraniol, nerol, lavandulol, citronellal, 2,6-dimethyl-7-octene-4-one-dihydrocarveol, pulegol, isopulegol, piperitol, terpineol and terpinenol;
$C_{10}H_{18}$: menthene;
$C_{10}H_{20}O$: citronellol;
$C_{11}H_{18}O$: nopol;
$C_{13}H_{20}O$: ionone and parmone;
$C_{14}H_{22}O$: irone;
$C_{15}H_{24}$: bisabolene, zingiberene, curcumene, cadinene, isocadinene, sesquibenihene, selinene, caryophyllene, metrosiderene, aromadendrene, cedreen, copaene, longifolene and santalene;
$C_{15}H_{24}O$: lanceol, sesquibenihiol, partheniol and santalol;
$C_{15}H_{26}O$: farnesol, nerolidol, elemol, cadinol, eudesmol, guaiol, carotol and cedrol;
$C_{15}H_{22}O$: atlantone, turmerone, cyperone, eremophilone and vetivone.

Terpenoides for use in the present invention are not limited to the above examples. The above terpenoides can be used alone or in combination. Of the above terpenoides, limonene is particularly preferable for use in the present invention because its ozone decomposition power is great.

In addition to the above terpenoides, mixtures of various vegetable extracts containing terpinoids or terpineol derivatives can also be preferably employed in the present invention.

The liquid alcohol employed in the present invention serves to dissolve any of the terpenoides therein. A preferable example of such liquid alcohol is benzyl alcohol, because benzyl alcohol also serves as a holding agent for making the terpenoide peristent in the ozone decomposing agent. As such liquid alcohols, saturated lower aliphatic alcohols, such as methyl alcohol and ethyl alcohol, can be employed. When such alcohols are employed, it is preferable to use them in combination of such a holding agent as diethyl phthalate.

Dibenzylidenesorbitol and sodium bis(4-t-butyl-phenyl)phosphate serve as a gelatinizer for gelling the terpenoide to make the terpenoide persistent in the ozone decomposing agent for appropriately controlling the vaporization rate of the terpenoide.

The solvent for dissolving therein dibenzylidenesorbitol or sodium bis(4-t-butylphenyl)phosphate serves as compatibilizing solvent to dissolve them in the above-mentioned alcohol such as benzyl alcohol since dibenzylidenesorbitol and sodium bis(4-t-butyl-phenyl) phosphate are insoluble in the above-mentioned alcohol at room temperature.

Specific examples of such compatibilizing solvent are N-methyl-2-pyrrolidone, dimethyl sulfoxide and dimethylformamide. Of these compatiblizing solvents, N-methyl-2pyrrolidone is preferable for use in the present invention because it is a liquid soluble in both alcohols and water, scarcely volatile at room temperature, odorless, light colored, and almost innoxious. Further, sodium bis(4-t-butylphenyl)phosphate is highly soluble in N-methyl-2-pyrrolidone. Moreover, N-methyl-2-pyrrolidone promotes gelling action of dibenzylidenesorbitol and sodium bis(4-t-butyl-phenyl)phosphate.

In addition to the above components, vaporization control agents such cellulose derivatives, polvinyl pyrrolidone, and polyhydric alcohols can be employed in order to control the vaporization of the terpenoide so as to be constant over an extended period of time at room temperature.

It is preferable that the cellulose derivatives be soluble in water and alcohols. The cellulose derivatives serve to reduces the volatility of the alcohol employed in the present invention. Specific examples of the cellulose derivatives are hydroxypropylcellulose and hydroxyethyl-cellulose.

Polyvinyl pyrrolidone can be used instead of the above cellulose derivatives.

Polyhydric alcohols serves not only as humectant for preventing the ozone decomposing agent from becoming dried, but also as a component of a gelation promoting agent for preventing the separation of the terpenoide from the alcohol and facilitating uniform vaporization of the two. Examples of polyhydric alcohols are gylcols and glycerin. Specific examples of glycols are propylene glycol, polpropylene glycol and polyethylene glycol. These can be used alone or in combination.

In 100 parts by weight of the ozone decomposing agent according to the present invention, it is preferable that the amount of the terpenoide be in the range of 1 to 80 parts by weight, more preferably in the range of 20 to 50 parts by weight, the amount of the alcohol be in the range of 10 to 97 parts by weight, more preferably in the range of 40 to 60 parts by weight, the amount of dibenzylidene sorbitol or sodium bis(4-t-butyl-phenyl)phosphate be in the range of a trace amount to 3 parts by weight, and the amount of a solvent for dissolving therein dibenzylidenesorbitol or sodium bis(4-t-butylphenyl)phosphate be in the range of 1 to 10 parts by weight.

Dibenzylidenesorbitol and sodium bis(4-t-butylphenyl)phosphate are soluble with a maximum concentration of about 25% in a solvent such as N-methyl-2-pyrrolidone as mentioned previously. It is preferable that this saturated solution of dibenzylidenesorbitol or sodium bis(4-t-butylphenyl)phosphate be mixed with a concentration of 1 to 10% to the alcohol solution of the terpenoide.

It is preferable that the amount of the cellulose derivatives or polyvinyl pyrrolidone be in the range of 2 to 5 wt. % to the alcohol such as benzyl alcohol, and the amount of the humectant be in the range of 10 to 20 wt. % to such alcohol.

The concentration of the terpenoide in the ozone decomposing agent according to the present invention may be adjusted depending upon where and for what purpose it is used. When it is used, for instance, in an electrophotographic copying machine in which ozone is formed with a low concentration, the concentration of the terpenoide may be low, while when it is used, for instance, for treatment and purification of water, the concentration of the terpenoide has to be high.

The ozone decomposing agent according to the present invention can be prepared, for instance, as follows:

Alcohol and a cellulose derivative are mixed and stirred in a high speed mixer until the cellulose derivative is dissolved in alcohol. To this solution, the terpenoide and glycol or glycerin are gradually added with stirring.

A saturated solution of N-methyl-2-pyrrolidone and dibenzylidenesorbitol or sodium bis(4-t-butylphenyl)phosphate is added dropwise to the above mixture and stirred for 1 to 10 minutes to prepare a viscous liquid. The thus prepared viscous liquid is placed in an appropriate container and is cooled to become solid. The viscous liquid becomes solid with time even though it is not cooled.

The above-mentioned ozone decomposing agent is a jelly-like agent in which the terpenoide and the alcohol are gelled.

The ozone decomposing agent according to the present invention can be prepared by use of the terpenoide and a water-soluble gelling agent without using alcohol. In this case, one or more terpenodes can be employed in the same manner as in the above-mentioned ozone decomposing agent.

Specific examples of a water-soluble gelling agent are sodium polyacrylate, sodium alginate, gelatin, agar, gelan gum and succinoglucan.

As a gelling auxiliary agent, cellulose derivatives can also be employed.

In the above second embodiment of an ozone decomposing agent according to the present invention, it is also preferable that the amount of the terpenoide be in the range of about 20 wt. % to 50 wt. % in the ozone decomposing agent.

The diffusing amount of the ozone decomposing agent can be appropriately controlled by placing the ozone decomposing agent in a container with a lid having a plurality of holes and by adjusting the number of the holes or the size of each hole.

When the diffusing amount is reduced, the lid is covered with a membrane filter or a teflon film.

When the ozone decomposing agent according to the present invention is employed in practice, in particular, for decomposing a small quantity of ozone formed in an electrophotographic copying machine, the decomposing agent can be placed either inside or outside the copying machine.

When the ozone decomposing agent is used for purifying water, the decomposing agent may be placed within an exhaust tower. In this case, the ozone decomposing agent diffuses and the terpenoide contained therein comes into contact with ozone contained with high concentration in the air passing through the tower, so that the ozone is decomposed. Thus, no suction apparatus is necessary in this case unlike the case where a filter containing activated carbon is employed. In this case, a relatively large amount of the terpenoide has to be diffused, since a large amount of ozone has to be decomposed. For this purpose, the concentration of the terpenoide in the ozone decomposing agent may be increased, or the number of the containers holding the agent to be placed may be increased.

The features of this invention will become more apparent in the course of the following description of exemplary embodiments, which are given for illustration of the invention and are not intended to be limiting thereof.

EXAMPLE 1

Hydroxypropylethylcelluose was added at a concentration of 3% to purified benzyl alcohol and the mixture was subjected to high speed stirring, so that hydroxypropylethylcellulose was dissolved in benzyl alcohol.

40 parts by weight of the above solution, 40 parts by weight of limonene, and 15 parts by weight of propylene glycol were mixed and the mixture was stirred slowly.

5 parts by weight of a saturated N-methyl-2-pyrrolidone solution of dibenzylidenesorbitol were dropwise added to the above mixture and stirred for 10 minutes to prepare a viscous liquid.

100 g of the thus prepared viscous liquid was placed in a shallow circular vessel 1 having a diameter of about 7 cm as shown in FIG. 1. In one hour, it became jelly-like, whereby an ozone decomposing agent No. 1 according to the present invention was prepared. The vessel 1 was then covered with a lid 3 including 9 holes having a diameter of 2 mm for diffusing the ozone decomposing agent therefrom.

100 g of the above ozone decomposing agent contained 40 g of limonene.

An analysis by gas chromatography of the diffusing amount of limonene from this ozone decomposing agent indicated that the diffusing amount was 2.5 mg/hour at room temperature (20° C.), and 15 mg/hour at 37° C., and the diffusing amount was almost constant over a period of 150 hours at each temperature.

Therefore, when the above ozone decomposing agent is employed at room temperature, the ozone decomposing effect will last for more than 600 days.

Figure 2:
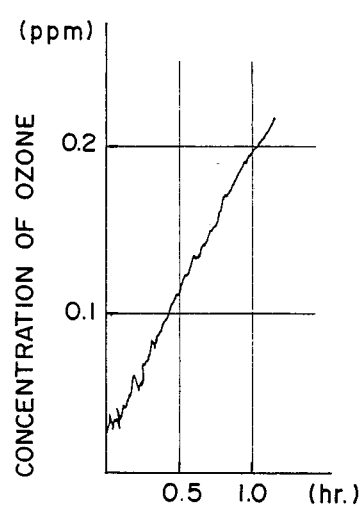
FIG. 2 is a graph showning the changes in the concentration of ozone in the air with time in a room in which an electrostatic copying machine is placed with copies being made.

Next, a commercially available electrostatic copying machine was installed in a room of 32 m³ and copies were made at a rate of 1500 copies/hour without letting fresh air in, thus the amount of ozone formed was measured by an ozone monitor. The amount of ozone accumulated as shown in the graph of FIG. 2. One hour later, the concentration amounted to 0.2 ppm.

Figure 3:
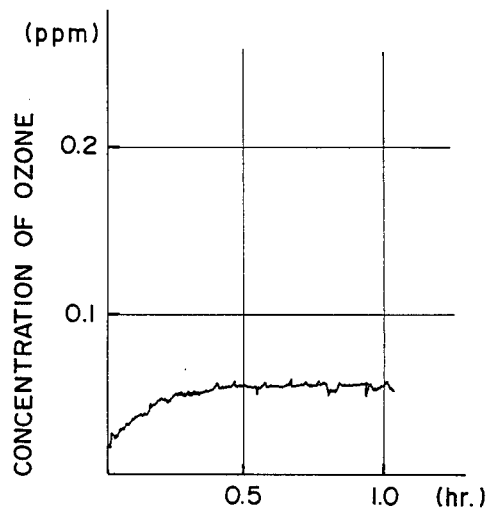
FIG. 3 is a graph showning the changes in the concentration of ozone in the air with time in the same room in which the same electrostatic copying machine as that employed in the case of FIG. 2 is placed, with copies being made, and an ozone decomposing agent according to the present invention is also placed near the copying machine.

The ozone decomposing agent No. 1 according to the present invention was placed near a front cover of the electrostatic copying machine with an inner temperature of 36° C., so that the amount of ozone formed was measured by the same ozone monitor in the same room under the same conditions as mentioned above. The result was that the concentration of ozone was as low as 0.05 ppm even one hour after starting the test, and the concentration did not increase thereafter as shown in the graph of FIG. 3.

In order to investigate the relationship between the concentration of ozone and the concentration of limonene in the course of decomposition of ozone by limonene, ozone and limonene were placed in a vessel of about ⅓ m³ with the following respective concentrations and the concentration of ozone was measured in each combination 20 minutes after mixing the two. The results were as follows:

|     | Ozone  | Limonene | Concentration of Ozone (after 20 minutes) |
|-----|--------|----------|-------------------------------------------|
| (1) | 1 ppm  | 1 ppm    | 0 ppm                                     |
| (2) | 1 ppm  | 5 ppm    | 0 ppm                                     |
| (3) | 10 ppm | 1 ppm    | 6.5 ppm                                   |
| (4) | 10 ppm | 5 ppm    | 0 ppm                                     |

Limonene in the above ozone decomposing agent was replaced by other terpenoides such as myrcene, linalool and terpineol to prepare ozone decomposing agents according to the present invention. These ozone decomposing agents were subjected to the same experiments as mentioned above. The result was that myrcene, linalool and terpineol were slightly inferior to limonene in the ozone decomposing power, but they have sufficiently high ozone decomposing power for use in practice.

EXAMPLE 2

Hydroxypropylethylcelluose was added at a concentration of 3% to purified benzyl alcohol and the mixture was subjected to high speed stirring, so that hydroxypropylethylcellulose was dissolved in benzyl alcohol.

50 parts by weight of the above solution, 20 parts by weight of myrcene, and 25 parts by weight of propylene glycol were mixed and the mixture was stirred slowly.

5 parts by weight of a saturated N-methyl-2-pyrrolidone solution of sodium bis(4-t-butylphenyl)phosphate were dropwise added to the above mixture and stirred for 8 minutes to prepare a viscous liquid.

The thus prepared viscous liquid was placed in the same shallow vessel as that employed in Example 1, and cooled to solidify the liquid, whereby an ozone decomposing agent No. 2 according to the present invention was prepared.

EXAMPLE 3

Hydroxypropylethylcelluose was added at a concentration of 2% to a mixture of purified ethyl alcohol and diethyl phthalate with a mixing ratio of 2:3 by weight. The thus formed mixture was then subjected to high speed stirring, so that hydroxypropylethylcellulose was dissolved in the mixture.

51 parts by weight of the above solution (consisting of 20% of ethyl alcohol, 30% of diethyl phthalate and 1% of hydroxypropylcellulose), 20 parts by weight of D-limonene, and 24 parts by weight of propylene glycol were mixed and the mixture was stirred slowly.

5 parts by weight of a saturated N-methyl-2-pyrrolidone solution of dibenzylidenesorbitol were dropwise added to the above mixture and stirred to prepare a viscous liquid.

The thus prepared viscous liquid was placed in the same shallow vessel as that employed in Example 1, and cooled to solidify the liquid, whereby an ozone decomposing agent No. 3 according to the present invention was prepared.

EXAMPLE 4

20 parts by weight of linalool and 50 parts by weight of a 10% aqueous solution of sodium aliginate were mixed with stirring under application of heat, whereby the mixture was completely mixed. 30 parts by of a saturated aqueous solution of sodium polyacrylate to the above mixture to form an opaque liquid. The mixture was stirred until it began to become viscous.

The thus prepared viscous liquid was placed in the same shallow vessel as that employed in Example 1, and cooled to solidify the liquid, whereby a jelly-like ozone decomposing agent No. 4 according to the present invention was prepared.

The ozone decomposing agent according to the present invention is in the form of a jelly-like solid, so that the diffusing rate of the ozone decomposing component, terpenoide, is made relatively constant as compared with a liquid ozone decomposing agent, and the ozone decomposing effect last about 10 times longer than a conventional liquid ozone decomposing agent using the same amount of terpenoide. Furthermore, the above mentioned diffusing rate can be controlled as desired so as to decompose ozone in a most efficient manner depending upon its application.

Moreover it is much less inexpensive than the conventional ozone decomposing agents using activated carbon and rubber olefin polymer.

What is claimed is:

1. An ozone decomposing agent comprising at least one terpenoide capable of decomposing ozone, a liquid alcohol for dissolving therein said terpenoide, sodium bis(4-t-butylphenyl)phosphate, and a solvent for dissolving therein sodium bis(4-t-butylphenyl)phosphate.

2. The ozone decomposing agent as claimed in claim 1, wherein said terpenoide is in an amount ranging from 1 to 80 wt. %, said liquid alcohol is in an amount ranging from 10 to 97 wt. %, said sodium bis(4-t-butylphenyl)phosphate is in an amount ranging from a trace amount to 3 wt. %, and said solvent is in an amount ranging from 1 to 10 wt. %.

3. The ozone decomposing agent as claimed in claim 1, wherein said terpenoide is a terpenoide having a general formula of $C_mH_{2n+14}O_p$ wherein $m=9\sim15$, $n=0\sim4$ and $p=0\sim2$.

4. The ozone decomposing agent as claimed in claim 1, wherein said liquid alcohol is benzyl alcohol.

5. The ozone decomposing agent as claimed in claim 1, wherein said solvent is selected from the group consisting of N-methyl-2-pyrrolidone, dimethyl sulfoxide and dimethylformamide.

6. The ozone decomposing agent as claimed in claim 1, further comprising a vaporization control agent selected from the group consisting of cellulose derivatives, polyvinyl pyrrolidone and polyhydric alcohols.

7. The ozone decomposing agent as claimed in claim 1, further comprising a gellation promoting agent comprising a polyhydric alcohol selected from the group consisting of glycols and glycerin.

8. An ozone decomposing agent comprising at least one terpenoide capable of decomposing ozone, a liquid alcohol for dissolving therein said terpenoide, dibenzylidenesorbitol, and a solvent for dissolving therein said dibenzylidenesorbitol selected from the group consisting of dimethylsulfoxide and dimethylformamide.

9. The ozone decomposing agent of claim 8, wherein said terpenoide is in an amount ranging from 1 to 80 wt. %, said liquid alcohol is in an amount ranging from 10 to 97 wt. %, said diobenzylidenesorbitol is in an amount ranging from a trace amount to 3 wt. %, and said solvent is in an amount ranging from 1 to 10 wt. %.

10. The ozone decomposing agent of claim 8, wherein said terpenoide is a terpenoide having a general formula of $C_mH_{2n+14}O_p$ wherein m=0-4 and p=0-2.

11. The ozone decompsoig agent of claim 8, wherein said liquid alcohol is benzyl alcohol.

12. The ozone decomposoing agent of claim 8, further comprising a vaporization control agent selected from the group consisting of cellulose derivatives, polyvinyl pyrrolidone and polyhydric alcohols.

13. The ozone decomposing agent of claim 8, further comprising a gellation promoting agent comprising a polyhydric alcohol selected from the group consisting of alcohols and glycerin.

14. A method of decomposing ozone, comprising contacting ozone with an amount of an ozone decomposing agent suficient to decompose said ozone, wherein said decomposing agent comprises at least one terpenoide capable of decomposing ozone, a liquid alcohol for dissolving therein said terpenoide, dibenzylidenesorbitol or sodium bis(4-t-butylphenyl)phosphate, and a solvent for dissolving therein dibenzylidenesorbitol or sodium bis(4-t-butylphenyl)phosphate.

15. The method of claim 14, wherein said ozone decomposing agent further comprises a vaporization control agent selected from the group consisting of cellulose derivatives, polyvinyl pyrrolidone and polyhydric alcohols.

16. The method of claim 14, wherein said ozone decomposing agent further comprises a gellation promoting agent comprising a polyhydric alcohol selected from the group consisting of glycols and glycerin.

17. A method of decomposing ozone, comprising contacting ozone with an amount of an ozone decomposing agent sufficient to decompose said ozone, wherein said ozone decomposing agent comprises at least one terpenoide capable of decomposing ozone and a water-soluble gellation agent for holding said terpenoide therein.

18. The method of claim 17, wherein said water-soluble gellation agent is selected from the group consisting of sodium polyacrylate, sodium alginate, gelatin, agar, gelan gum and succinoglucan.

19. The ozone decomposing agent of claim 3, wherein said terpenoide is limonene.

20. The ozone decomposing agent of claim 10, wherein said terpenoide is limonene.

21. The ozone decomposing agent of claim 14, wherein said terpenoide is limonene.

* * * * *